US007184981B2

(12) United States Patent
Olin

(10) Patent No.: US 7,184,981 B2
(45) Date of Patent: Feb. 27, 2007

(54) METHOD AND SYSTEM FOR THE CREATION OF A CLASS OF LOAN SECURITIES

(75) Inventor: Gregg R. Olin, Fairport, NY (US)

(73) Assignee: X/Net Associates, Inc., Fairport, NY (US)

( * ) Notice: Subject to any disclaimer, the term of this patent is extended or adjusted under 35 U.S.C. 154(b) by 1085 days.

(21) Appl. No.: 09/731,174

(22) Filed: Dec. 6, 2000

(65) Prior Publication Data

US 2002/0069160 A1 Jun. 6, 2002

Related U.S. Application Data

(60) Provisional application No. 60/169,079, filed on Dec. 6, 1999.

(51) Int. Cl.
*G06Q 40/00* (2006.01)
(52) U.S. Cl. .................. 705/36 R; 705/35; 705/37

(58) Field of Classification Search .................. 705/35, 705/37, 38, 36, 36 R
See application file for complete search history.

(56) References Cited

U.S. PATENT DOCUMENTS 5,911,136 A * 6/1999 Atkins .................. 705/36

OTHER PUBLICATIONS

"Wall Street Tailors MBS Cash Flows in Attempt to Match Investor Tastes." Asset Sales Report. v7, n38, Oct. 11, 1993.*

* cited by examiner

*Primary Examiner*—Vincent Millin
*Assistant Examiner*—Dan Kesack
(74) *Attorney, Agent, or Firm*—Nixon Peabody LLP

(57) ABSTRACT

An automated system and method for creating a class of loan securities includes determining if a characteristic for each of a plurality the loans satisfies at least one criteria, selecting each of the plurality of loans that satisfy the criteria, and creating the class of loan securities using the selected loans.

36 Claims, 3 Drawing Sheets

METHOD AND SYSTEM FOR THE CREATION OF A CLASS OF LOAN SECURITIES

This application claims the benefit of U.S. Provisional Patent Application Ser. No. 60/169,079 filed on Dec. 6, 1999 now abandoned, which is herein incorporated by reference.

FIELD OF THE INVENTION

The present invention relates to a system and method for the creation of one or more classes of loan securities created by stratifying any and all origination and servicing performance data for any and all loans, including locating, selecting, and offering to buy the underlying loans available for purchase from any participating lender.

BACKGROUND OF THE INVENTION

Currently, applicants submit loan applications to lenders who may extend credit to the applicants for purchases. As these loans begin to accumulate, the lenders often bundle their portfolios of loans together for sale. Investment banks and others often purchase these bundles of loans to form one or more loan securities.

One of the problems investment banks and others who purchase these loans face is in identifying the appropriate loans to purchase. Currently, an enormous amount of time and capital is expended in the process of manually identifying and analyzing the appropriate loans to select to include in a security.

In view of these expenditures of time and capital, the loans are typically only purchased from large and well known lenders. However, only a portion of the loans being made are held by these large and well known lenders. Accordingly, a large number of loans being made by small to midsize lenders, such as credit unions and small regional bank and lending institutions, are less able to be included in securities.

SUMMARY OF THE INVENTION

An automated method for creating a class of loan securities in accordance with one embodiment of the present invention includes determining if a characteristic for each of a plurality the loans satisfies at least one criteria, selecting each of the plurality of loans that satisfy the criteria, and creating the class of loan securities using the selected loans.

An automated system for creating a class of loan securities in accordance with another embodiment of the present invention includes a determining system, a selecting system, and a securities class generation system. The determining system determines if a characteristic for each of a plurality the loans satisfies at least one criteria. The selecting system selects each of the plurality of loans that satisfy the criteria. The securities class generation system creates the class of loan securities using the selected loans.

A computer readable medium in accordance with another embodiment of the present invention has stored instructions for creating a class of loan securities which when executed by a processor, cause the processor to perform the steps of: determining if a characteristic for each of a plurality the loans satisfies at least one criteria; selecting each of the plurality of loans that satisfy the criteria; and creating the class of loan securities using the selected loans.

With the present invention, made to order asset backed class of securities can be identified from multiple portfolios and be put together in an automated process which operates in near real-time. As a result, loans from all types of lenders can be quickly examined to identify appropriate loans which satisfy preset criteria and then selected for a particular class of security as requested by a securities dealer.

For example, loan data can be collected from sources, such as automobile dealers' lenders who have financed automobiles. Meanwhile, a securities dealer selects criteria for a class or pool of securities he would like to offer. The criteria is used to select, as they become available in near real-time, specific loans that will make up the given class or pool desired. During this process, portfolio analyses tools can be incorporated to ensure risk assessment and credit quality. Additionally, structured finance monitoring technology can be incorporated that provides the purchasers of the classes of securities a near real-time look at performance data.

DETAILED DESCRIPTION OF THE INVENTION

Figure 1:
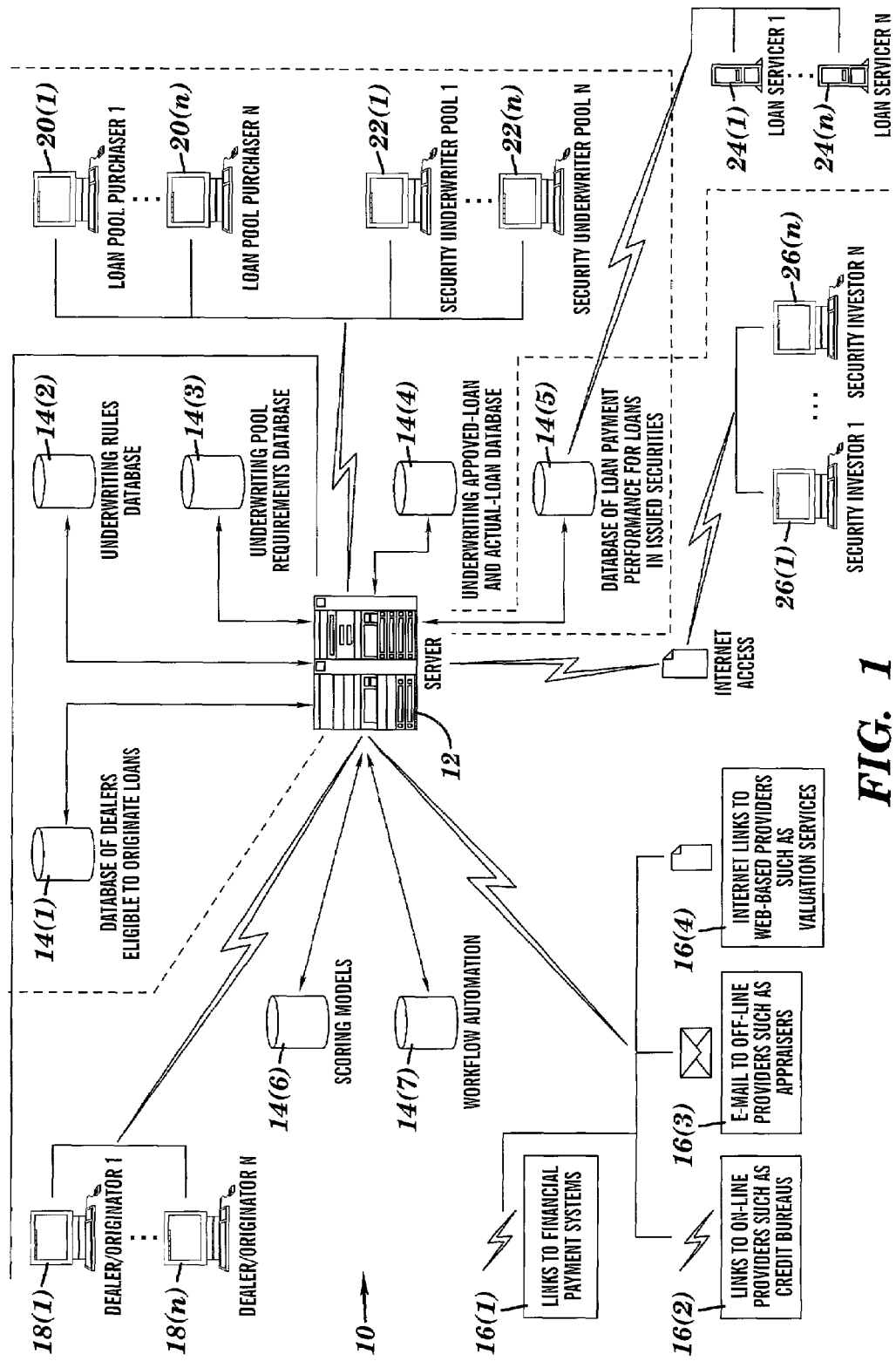
FIG. 1 is a block diagram of a system for the creation of a class of loan securities in accordance with one embodiment of the present invention.
Figure 2:
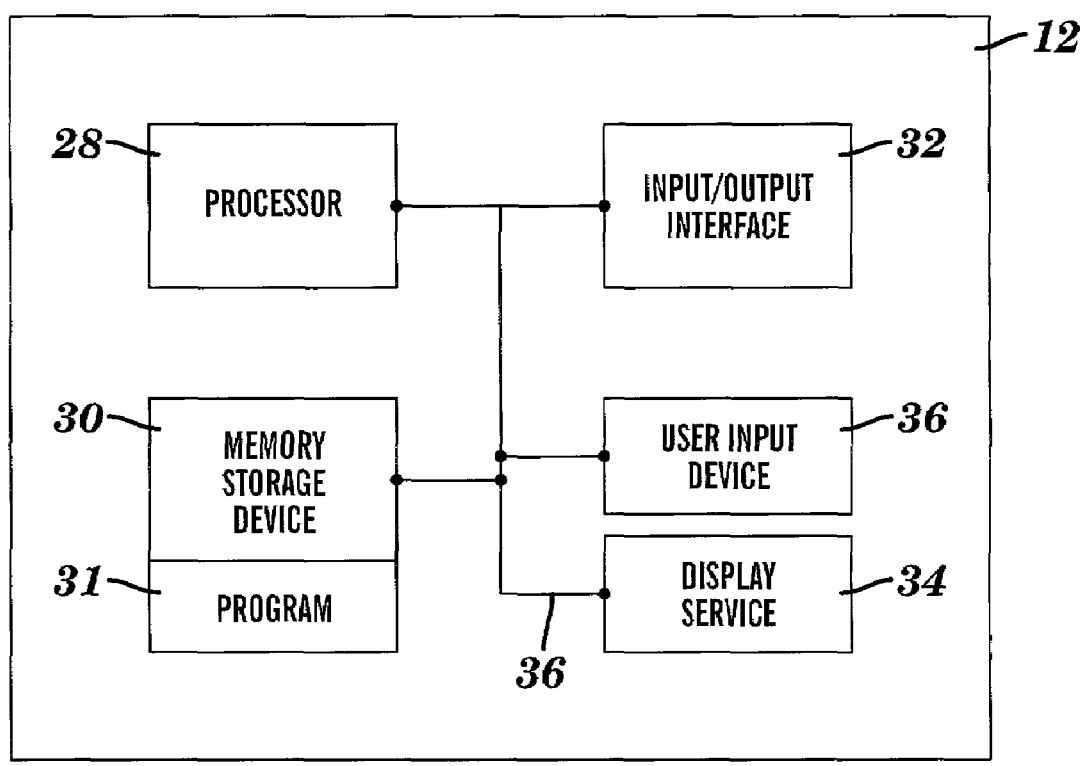
FIG. 2 is a block diagram of a securities generation server in accordance with another embodiment of the present invention.
Figure 3:
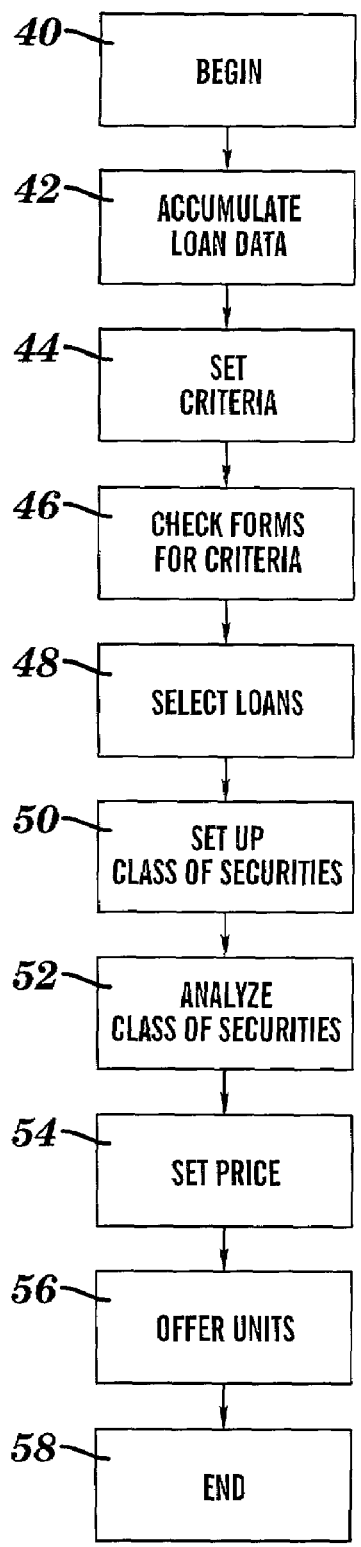
FIG. 3 is a flow chart of a method for the creation of a class of loan securities.

A system 10 and method for creating loan securities in accordance with one embodiment of the present invention is illustrated in FIGS. 1–3. The system 10 and method for creating a class of loan securities in accordance with one embodiment of the present invention includes determining if a characteristic for each of a plurality the loans satisfies at least one criteria, selecting each of the plurality of loans that satisfy the criteria, and creating the class of loan securities using the selected loans. The present invention advantageously provides a system 10 and method for identifying and putting together made to order asset backed classes of securities in near real-time.

Referring to FIGS. 1 and 2, in this particular embodiment the system 10 includes a securities generation server 12, a plurality of databases 14(1)–14(7), a plurality of research sources 16(1)–16(4), a plurality of sources of loan data 18(1)–18(n), a plurality of loan pool purchasers 20(1)–20(n), a plurality of security underwriters 22(1)–22(n), a plurality of loan servicers 24(1)–24(n) and a plurality of securities investors 26(1)–26(n), although system 10 may have other numbers(n) of and/or different combinations of each of these systems, such as just the securities generation server 12. The securities generation server 12 is operatively coupled to communicate with the plurality of databases 14(1)–14(7), the plurality of research sources 16(1)–16(4), the plurality of sources of loan data 18(1)–18(n), the plurality of loan pool purchasers 20(1)–20(n), the plurality of security underwriters 22(1)–22(n), the plurality of loan servicers 24(1)–24(n) and the plurality of securities investors 26(1)–26(n). A variety of communication systems and/or methods well known to those of ordinary skill in the art can be used to accomplish the operatively coupling and communication between the above-identified systems, including a direct connection, a local area network, a wide area network, the world wide web, modems and phone lines, or wireless communication technology each having communications protocols.

In this particular embodiment, the securities generation server 12 as shown in FIG. 2 includes a processor 28, a memory storage device 30, and an input/output interface 32, a display device 34, and a user input device 36 which are coupled together by a bus 38 or other link, although the system 10 can comprise other numbers(n) of and/or different combinations of components. The processor 28 executes a program of stored instructions for the method for creating loan securities in accordance with the present invention as described herein and set forth in FIG. 3. Although one processor 28 is shown, the securities generation server 12 can have multiple processors to execute the programmed instructions.

Referring to FIGS. 1 and 2, the memory storage device 30 stores at least one program 31 with the instructions for the method for creating loan securities for execution by the processor. The plurality of databases 14(1)–14(7) could also be stored in memory storage device 30, but in this particular embodiment are stored in other memory storage devices which are external to and are operatively coupled for communication with the securities generation server 12 using one of the communication systems and methods discussed earlier. In this particular example: database 14(1) has a list of dealers and others lenders eligible to originate loans; database 14(2) has data on the underwriting rules for loans being applied for; database 14(3) has data on underwriting pool requirements or criteria; database 14(4) has data on the approved loans and actual loans; database 14(5) has data on loan payment performance for loans in issued classes of loan securities to be used to monitor and forecast class performance, as well as to model and price future transactions; database 14(6) has data on scoring models for risk analysis and credit quality, stratification and forecasting; and database 14(7) has instructions for workflow automation which is used to determine source and target routing of various transactions or components thereof, and the processes applied to such. Although certain databases 14 are illustrated in the example above, system 10 can have other types of, numbers of, and combinations of databases as required for the particular application. Data for each of the databases 14 can be entered using the user input device 36 or via the input/output interface 32 which can be operatively coupled to another source of the data being downloaded.

A variety of different types of memory storage devices 30, such as a random access memory (RAM) or a read only memory (ROM) in the system or a floppy disk, hard disk, or CD ROM which is read from and/or written to by a magnetic or optical reading and/or writing system that is coupled to one or more of the processors, can be used to store these programmed instructions and data as well as other information. Although one memory storage 30 device is shown, the system can have multiple memory storage devices to store the programmed instructions or at least a portion of the programmed instructions can be stored at other locations, such as in one of the plurality of databases 14.

The input/output interface 32 is used by the securities generation server 12 to operatively couple and communicate with the plurality of databases 14(1)–14(7), the plurality of research sources 16(1)–16(4), the plurality of sources of loan data 18(1)–18(n), the plurality of loan pool purchasers 20(1)–20(n), the plurality of security underwriters 22(1)–22(n), the plurality of loan servicers 24(1)–24(n) and the plurality of securities investors 26(1)–26(n) in the manner discussed earlier.

The display device 34 displays information for an operator, such as the loans selected for a class of securities based on the criteria. A variety of different types of display devices 34 can be used, such as a monitor, printer, or any other type of device which can convey information to the user of the computer system. Again, although only one display device 34 is shown, the securities generation server 12 can have more than one display device 34.

The user input device 36 enables an operator to generate and transmit signals or commands to the securities generation server 12. A variety of different types of user input devices 36 can be used, such as a keyboard, computer mouse, or any other user input device which provides a mechanism for a user or operator to input data. The securities generation server 12 can have more than one user input device 36.

The plurality of research sources 16(1)–16(4) can be operatively coupled to communicate with the securities generation server 12 using communication techniques described earlier. The research sources 16(1)–16(4) can be accessed by the securities generation server 12 to obtain additional information about the loans to be used during an analysis of the loans being considered for the class of loan securities being created. In this particular example, the research sources 16 are financial payment systems 16(1), credit bureaus 16(2), appraisers 16(3), and valuation services 16(4), although other types of research sources 16 can be used depending on the need for the particular application. Additionally, in this particular embodiment, each of the research sources 16(1)–16(4) will be a server or other programmed computer system to carry out the steps described above, although other devices or systems could be used for each of the research sources 16(1)–16(4).

The plurality of sources of loan data 18(1)–18(n) are also operatively coupled to communicate with the securities generation server 12 using communication techniques described earlier. Typically, the sources of loan data 18 will be traditional lenders, such as banks and credit unions, although other sources can also be used, such as any jurisdictionally licensed lender. Additionally, the present invention can be set up so that non-traditional sources of loan data, can by-pass the traditional lenders and deal directly with loan pool purchasers 20. In this particular embodiment, each of the sources of loan data 18(1)–18(4) is a memory storage device or other server or programmed computer system at a lender or dealer in which loan data is stored and/or created when a loan is executed, although other devices or systems could be used for each of the sources of loan data 18(1)–18(n).

The plurality of loan pool purchasers 20(1)–20(n) are also operatively coupled to communicate with the securities generation server 12 using communication techniques described earlier. In this particular embodiment, each of the loan pool purchasers 20(1)–20(n) can perform a number of functions including setting one or more criteria to define the types of loans to be selected and purchased to create a class of loan securities, although the loan pool purchasers 20(1)–20(n) can perform other functions as required by the particular application. Additionally, in this particular embodiment each of the loan pool purchasers 20(1)–20(n) is a server or programmed computer system at which a security dealer enters in criteria for creating a class of loan securities and carries out other steps described herein, although other types of devices or systems can be used for each of the loan pool purchasers 20(1)–20(n).

A variety of different criteria can be set and used as required or desired for a particular application. For example, the criteria may be: a minimum or maximum aggregate loan amount or size for each loan transaction; a defined percentage-blend of the loan types by credit grade, and loan amount; a certain characteristics of the dealer or originator of the loan data, such as only loans from credit unions; particular characteristics for the borrower's for each loan, such as each applicant's demographic and credit performance characteristics; the timing of each loan, such as the creation date, payment dates, or due date; a credit rating that at least a portion of each of the selected loans must be above; a geographic location that at least a portion of the selected loans must be in; a loan type that at least a portion of the selected loans must be; a specific collateral type that at least a portion of the selected loans must have; or a minimum LTV ratio that at least a portion of the selected loans must have. The following list of potential criteria is not intended to be exhaustive, but instead illustrative of the variety of different criteria that can be used to select loans.

The plurality of security underwriters 22(1)–22(n) are also operatively coupled to communicate with the securities generation server 12 using communication techniques described earlier. In this particular embodiment, each of the security underwriters 22(1)–22(n) can perform a number of functions, including analyzing one or more characteristics of the class of loan securities and determines a price per unit for the class, although the security underwriters 22(1)–22(n) can perform other functions and analyses depending on the particular application. Additionally, in this particular embodiment each of the security underwriters 22(1)–22(n) is a server or programmed computer system to carry out the steps described above, although other types of devices or systems can be used for each of the security underwriters 22(1)–22(n).

The plurality of loan servicers 24(1)–24(n) are also operatively coupled to communicate with the securities generation server 12 using communication techniques described earlier. In this particular embodiment, each of the loan servicers 24(1)–24(n) can perform a number of functions, including monitoring the payment performance of the loans in each of the issued classes of securities. Additionally, in this particular embodiment each of the security underwriters 22(1)–22 (n) is a server or programmed computer system designed to carry out the steps described above, although other types of devices or systems can be used for each of the security underwriters 22(1)–22(n).

The plurality of securities investors 26(1)–26(n) are also operatively coupled to communicate with the securities generation server 12 using communication techniques described earlier. In this particular embodiment, each of the securities investors 26(1)–26(n) can perform a variety of functions, including enabling the securities investor 26 to: review performance data for class of loan securities; define characteristics of a class of loan securities in which the security investor 26 would like to make an investments to define future offerings; or to purchase securities. Again this list of functions is not intended to be exhaustive of all of the possible functions, but merely illustrative. Additionally, in this particular embodiment each of the security underwriters 22(1)–22(n) is a server or programmed computer system designed to carry out the steps described above, although other types of devices or systems can be used for each of the securities investors 26(1)–26(n).

The method in accordance with one embodiment of the present invention will be discussed with reference to FIGS. 1–3. The method begins in step 40 and then in step 42 loan data is accumulated. In this particular example, an applicant through a source of loan data 18, such as a dealer, may submit an application for a loan. The lender will make a loan decision based on the loan application and, if approved, loan documents are completed and sent to the lender which then provides the loan funding. The data on this and other loans is stored at the source of loan data 20. With the present invention, the process of applying for and receiving the loans from which the loan data is supplied can be automated to enable real-time loan approvals or conditional-approvals twenty-four hours a day and seven days a week. The instructions and automation for this process can be stored in the workflow automation database 14(7). During the approval process links to third-party research sources 16(1)–16(4) can be automatically invoked by the securities generation server 12 at the appropriate stage of the loan application process, if and as required to process the loan. Data on the loans can be automated to flow from the source of loan data 18(1)–18(n) through the securities generation server 12 into the database 14(4) of approved and actual loans for storage. Although in this particular example, the loans are for automobiles, the present invention obviously can be extended to include other types of loans, such as other mortgage or other asset backed loans, or any other secured or unsecured credit instrument.

Meanwhile, a loan pool purchaser 20 in step 44 may set one or more criteria as described earlier for the creation of a class of loan securities and transmit the request to the securities generation server 12 for processing. The criteria for the class of loan securities can be input by an operator of the loan pool purchase 20 or could be stored and retrieved from a memory storage device, such as database 14(3).

In step 46, the securities generation server 12 determines if any of the loans in the approved and actual loan database 14(4) satisfy the selected criteria, although the securities generation server 12 could check other sources for loan data 18(1)–18(n), such as loans being received from lenders or by polling lenders to determine if they have any loans which meet the criteria. During this time of determining if any of the loans meet the set criteria, the securities generation server 12 may access other outside research sources 16(1)–16(4), such as a credit bureaus or valuations services, to verify that each of the loans satisfy other characteristics, such as a credit history of a valuation. Additionally, the securities generation server 12 may access information stored in the databases 14(1)–14(7), such as the database 14(1) to determine if the lender for one of the loans which may be selected is in the database of approved or eligible lenders.

In step 48, the securities generation server 12 selects the loans which satisfy the criteria and then in step 50 the securities generation server 12 sets up a class of loan securities based on the selected loans. In step 52, the securities generation server 12 analyzes the class of loan securities, such as the credit grade of the loans and the loan amounts, which again can be obtained from one of the databases 14(1)–14(7) or form an outside research source 16(1)–16(4). The particular rules used to analyze the class of loan securities can be retrieved from a memory storage device, such as database 14(2) or can be input by an operator using the user input device 36. Again, the particular types of characteristics examined can vary based on the particular application.

Based on the analysis of the class of loan securities, in step 52, the securities generation server 12 sets a price for each of the units of the class of loan securities in step 54. Next, in step 56 the server offers the class of loan securities for sale at the set price. In step 56, securities investors 26(1)–26(n) can purchase one or more of the units of the class of loan securities. The securities investors 26(1)–26(n) can also input information on types of classes of loan securities they would like to invest in.

Meanwhile, the loan servicers 24(1)–24(n) can monitor the payment of the loans in the classes of issued loan securities. The securities generation server 12 can use the data on the payment performance of the loans in the classes to adjust the price per unit for each of the classes of loan securities.

Accordingly, the present invention provides an automated system for creating market ready loan securities in near real time. As a result, the expensive and time consuming manual process of examining loans to determine if one or more is appropriate for the creation of a loan security is eliminated. Additionally, the present invention enables loans from many small to mid-size lenders which were rarely pooled together to form loan securities to be included in this process. As a result, entirely new classes of securities can be created. Further, the present invention is able to automatically examine certain characteristics of each loan by accessing outside research sources automatically as well as internally stored databases, such as an approved list of lenders.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. An automated method for creating at least one class of loan securities, the method comprising:
    determining with at least one computing device if a characteristic for each of a plurality of loans in at least one database satisfies at least one criteria;
    selecting each of the plurality of loans that satisfy the criteria with the at least one computing device; and
    creating a class of loan securities using the selected loans with the at least one computing device.

2. The method as set forth in claim 1 further comprising:
    modeling the class of loan securities that may be offered for sale with the at least one computing device; and
    determining with the at least one computing device whether to proceed with creating the class of loan securities based on the modeling.

3. The method as set forth in claim 1 further comprising locating the plurality of loans that may satisfy the criteria from at least one source with the at least one computing device.

4. The method as set forth in claim 1 further comprising:
    making an offer to buy the selected loans with at least one other computing device; and
    purchasing the selected loans with at least one other computing device where the offer was accepted.

5. The method as set forth in claim 1 further comprising setting the criteria for the class of loan securities with the at least one computing device.

6. The method as set forth in claim 5 wherein the criteria is at least one of: a lower limit for a loan amount that at least a portion of the selected loans must be above; a credit rating that at least a portion of each of the selected loans must be above; a geographic location that at least a portion of the selected loans must be in; a loan type that at least a portion of the selected loans must be; a specific collateral type that at least a portion of the selected loans must have; or a minimum LTV ratio that at least a portion of the selected loans must have.

7. The method as set forth in claim 1 further comprising:
    analyzing at least one quality of the class of loan securities with the selected loans with the at least one computing device; and
    setting a price for units of the class of loan securities based on the analysis with the at least one computing device.

8. The method as set forth in claim 7 wherein the quality is risk.

9. The method as set forth in claim 7 further comprising selling the units of the class of loan securities with the at least one computing device at the set price.

10. An automated system for creating at least one class of loan securities, the system comprising:
    at least one database with a plurality of loans; ands
    at least one computing device that determines if a characteristic for each of a plurality the loans in the at least one database satisfies at least one criteria, selects each of the plurality of loans that satisfy the criteria, and creates the class of loan securities using the selected loans.

11. The system as set forth in claim 10 wherein the at least one computing device models the class of loan securities that may be offered for sale, and determines whether to proceed with creating the class of loan securities based on the modeling.

12. The system as set forth in claim 10 wherein the at least one computing device locates the plurality of loans that may satisfy the criteria from at least one source.

13. The system as set forth in claim 10 further comprising at least one other computing device that makes offers to buy the selected loans and purchases the selected loans where the offer was accepted.

14. The system as set forth in claim 10 wherein the at least one computing device sets the criteria for the class of loan securities.

15. The system as set forth in claim 10 wherein the criteria is at least one of a lower limit for a loan amount that at least a portion of the selected loans must be above; a credit rating that at least a portion of each of the selected loans must be above; a geographic location that at least a portion of the selected loans must be in; a loan type that at least a portion of the selected loans must be; a specific collateral type that at least a portion of the selected loans must have; or a minimum LTV ratio that at least a portion of the selected loans must have.

16. The system as set forth in claim 10 wherein the at least one computing device that analyzes at least one quality of the class of loan securities with the selected loans and sets a price for units of the class of loan securities based on the analysis.

17. The system as set forth in claim 16 wherein the quality is risk.

18. The system as set forth in claim 16 wherein the at least one computing device sells the units of the class of loan securities at the set price.

19. A computer readable medium having stored thereon instructions for creating at least one class of loan securities which when executed by a processor, cause the processor to perform the steps of:
    determining if a characteristic for each of a plurality of loans satisfies at least one criteria;

selecting each of the plurality of loans that satisfy the criteria; and creating the class of loan securities using the selected loans.

20. The medium as set forth in claim 19 further comprising:

modeling the class of loan securities that may be offered for sale; and determining whether to proceed with creating the class of loan securities based on the modeling.

21. The medium as set forth in claim 19 further comprising locating the plurality of loans that may satisfy the criteria from at least one source.

22. The medium as set forth in claim 19 further comprising:

making an offer to buy the selected loans; and purchasing the selected loans where the offer was accepted.

23. The medium as set forth in claim 19 further comprising setting the criteria for the class of loan securities.

24. The medium as set forth in claim 23 wherein the criteria is at least one of: a lower limit for a loan amount that at least a portion of the selected loans must be above; a credit rating that at least a portion of each of the selected loans must be above; a geographic location that at least a portion of the selected loans must be in; a loan type that at least a portion of the selected loans must be; a specific collateral type that at least a portion of the selected loans must have; or a minimum LTV ratio that at least a portion of the selected loans must have.

25. The medium as set forth in claim 1 further comprising:

analyzing at least one quality of the class of loan securities with the selected loans; and setting a price for units of the class of loan securities based on the analysis.

26. The medium as set forth in claim 25 wherein the quality is risk.

27. The medium as set forth in claim 25 further comprising selling the units of the class of loan securities at the set price.

28. A system for creating at least one class of loan securities, the system comprising:

means for determining if a characteristic for each of a plurality of loans satisfies at least one criteria;

means for selecting each of the plurality of loans that satisfy the criteria; and means for creating a class of loan securities using the selected loans.

29. The system as set forth in claim 28 further comprising:

means for modeling the class of loan securities that may be offered for sale; and means for determining whether to proceed with creating the class of loan securities based on the modeling.

30. The system as set forth in claim 28 further comprising means for locating the plurality of loans that may satisfy the criteria from at least one source.

31. The system as set forth in claim 28 further comprising:

means for making an offer to buy the selected loans; and means for purchasing the selected loans where the offer was accepted.

32. The system as set forth in claim 28 further comprising means for setting the criteria for the class of loan securities.

33. The system as set forth in claim 32 wherein the criteria is at least one of: a lower limit for a loan amount that at least a portion of the selected loans must be above; a credit rating that at least a portion of each of the selected loans must be above; a geographic location that at least a portion of the selected loans must be in; a loan type that at least a portion of the selected loans must be; a specific collateral type that at least a portion of the selected loans must have; or a minimum LTV ratio that at least a portion of the selected loans must have.

34. The system as set forth in claim 28 further comprising:

means for analyzing at least one quality of the class of loan securities with the selected loans; and setting a price for units of the class of loan securities based on the analysis.

35. The system as set forth in claim 34 wherein the quality is risk.

36. The system as set forth in claim 34 further comprising selling the units of the class of loan securities at the set price.

* * * * *